United States Patent [19]

Pastor et al.

[11] Patent Number: 4,857,293
[45] Date of Patent: Aug. 15, 1989

[54] PROCESS FOR THE PREPARATION OF ULTRAPURE HEAVY METAL FLUORIDES

[75] Inventors: Ricardo C. Pastor, Manhattan Beach; Luisa E. Gorre, Oxnard, both of Calif.

[73] Assignee: Hughes Aircraft Company, Los Angeles, Calif.

[21] Appl. No.: 109,360

[22] Filed: Oct. 15, 1987

Related U.S. Application Data

[63] Continuation of Ser. No. 686,773, Dec. 27, 1984, abandoned.

[51] Int. Cl.$^4$ ......................... C01B 9/08; C01G 21/16
[52] U.S. Cl. ................................................. 423/489
[58] Field of Search .................. 423/489, 494, 94, 88

[56] References Cited

FOREIGN PATENT DOCUMENTS 86056  8/1983  European Pat. Off. ............ 423/489

OTHER PUBLICATIONS

Handbook of Preparative Inorganic Chemistry, 2nd ed., Braver, ed. Academic Press, 1963, vol. 1, p. 150.
Chemistry of the Elements, Greenwood and Earnshaw, Pergamon Press, 1984, pp. 958-959.

Primary Examiner—John Doll
Assistant Examiner—Jeffrey Edwin Russel
Attorney, Agent, or Firm—Wanda K. Denson-Low

[57] ABSTRACT

This invention provides a method for the preparation of ultrapure active metal fluorides of increased purity from their metal oxides by reacting an active metal with a predetermined amount of HF(aq) to form a solid reaction product which is dried under controlled heating to form a hydrated fluoride. This hydrated active metal fluoride is then subjected to reactive atmosphere processing comprising hydrofluoric acid vapor in a $CO_2$ reactive carrier gas and a selected halide compound in the gas phase for a predetermined period of time to further increase anion purity.

7 Claims, 2 Drawing Sheets

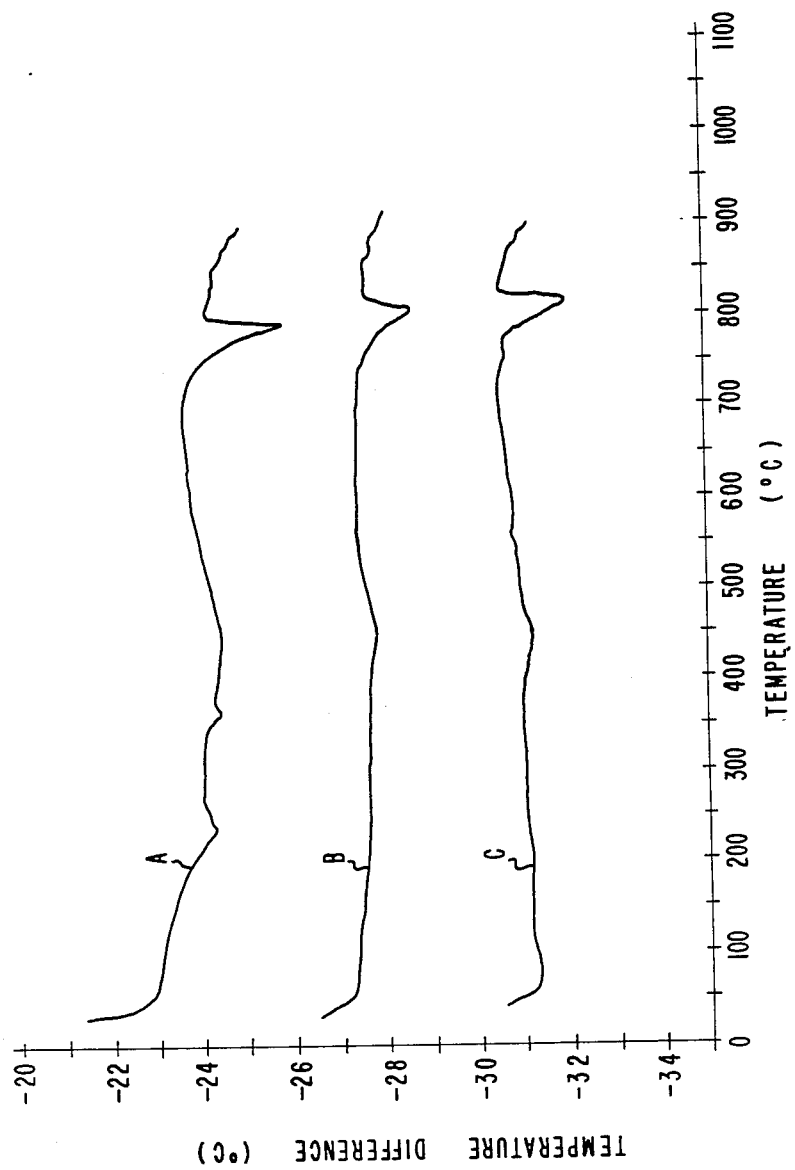

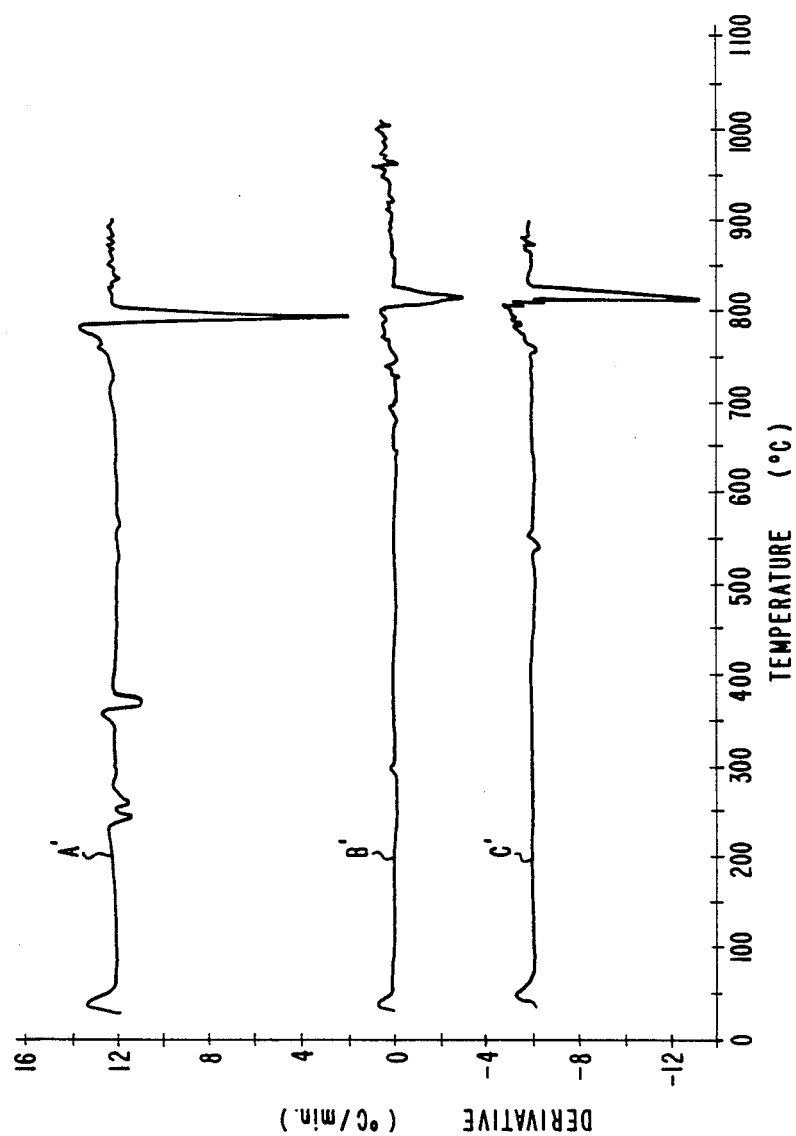

4,857,293

PROCESS FOR THE PREPARATION OF ULTRAPURE HEAVY METAL FLUORIDES

This is a continuation of application Ser. No. 686,773, filed Dec. 27, 1984, now abandoned.

TECHNICAL FIELD

This invention relates to metal fluorides. More particularly, this invention relates to an improved process for the preparation of heavy metal fluorides which behave as pseudo-noble metals having lower concentration levels of water-derived impurities than those previously known to exist in the art.

BACKGROUND OF THE INVENTION

Materials which are used to form optical components, such as laser windows or optical fibers, must be transparent to the particular wavelength of radiation that they must transmit. The use, particularly of metal halides as windows for high powered lasers at 2-6 micrometers and 10.6 micrometers, requires rigid constraints on anion purity levels. Metal halide crystals grown from state-of-the-art purified starting materials contain trace cation and anion contaminants which, when subject to high energy laser applications, cause undesirable optical absorption and structural failures. Even materials having purities of 99.999% form windows which have an undesirable tendency to absorb energy from the laser beam. This absorption of energy can cause the window to overheat, resulting in fracture and opacity.

Anion purity, therefore, is a primary concern for high-power IR window materials since anions, particularly $OH^-$ and $O^=$, contribute significantly to IR absorption. The vibrational modes of anions are infrared active and often involve high absorption cross-sections so that mush less than one ppm is needed to achieve an absorption coefficient below 0.001 cm$^{-1}$ in the crystal.

Metal fluorides such as thorium fluoride ($ThF_4$), and lead fluoride ($PbF_2$) have recently been found to be useful for, among other things, thin film reflectors and anti-reflectors which are suitable for use in high-power carbon dioxide laser systems. When used as a reflector, these fluoride compounds are provided as thin films on a suitable substrate that is external to the laser resonator cavity. These films can thereby deflect the laser beam in a predetermined direction toward the target. It is desirable to deflect the laser beam efficiently, in order to prevent losses in the laser beam intensity. When used as an antireflector, materials such as thorium fluoride and lead fluoride may be coated on the surface of a laser window to provide a refractive index at the window surface such that the reflection of the laser beam is minimized while the transmission of the laser beam through the window is maximized. However, in order to be suitable for such purposes, these fluoride compounds must have a high transmission and low absorption for the 10.6 micrometer radiation from the carbon dioxide laser so that the film will not heat up enough to cause its own destruction, as discussed previously.

Commerical powders currently available are unsuitable starting materials for the congruent growth of certain metal fluorides, particularly those such as $ThF_4$ and $PbF_2$. The anion purity of these powders may be no better than three-nines complete in the conversion to the fluoride. A few hundred ppm of oxide or hydroxide in rare-earth or alkaline-earth fluoride powders cause difficulties in crystal growth. However, even if the anion purity is satisfactory after conversion, an alternate problem such as the stability of the powder is encountered. In particular, the powder can undergo hydrolysis as a result of the absorbance of moisture from the air.

Several methods are given for the conversion of metal oxides to metal halides. One method which involves treatment with anhydrous HF, a method capable of achieving four nines conversion, encounters two difficulties. The large amount of water formed renders HF vapor very corrosive, and therefore, there is a tendency for the metal halide to pick up further impurities. The exothermic reaction has a runaway tendency which thwarts further conversion by confining the reaction to the surface, resulting in the formation of a crust.

Another more effective procedure, which combines the wet and dry conversions, is disclosed by R. C. Pastor and R. K. Chew, entitled "Process for the Preparation of Ultrapure Thorium Fluoride", U.S. Pat. No. 4,519,986, which issued on May 28, 1985, which is assigned to the present assignee. In one embodiment of the invention, thorium oxide is reacted with a predetermined amount of hydrofluoric acid to form a solid reaction product which is then dried under controlled heating to form hydrated thorium fluoride. The hydrated thorium fluoride is then exposed to a reactive atmosphere comprising hydrofluoric acid vapor and a chosen fluoride compound in the gas phase, utilizing an inert helium carrier gas at elevated temperatures. The hydrated thorium fluoride is exposed to this reactive atmosphere for a selected period of time to remove substantially all of the water and water-derived impurities from the hydrated thorium fluoride. This process is particularly useful in the production of heavy metal fluorides in the crystal form.

Metal halides have been purified by numerous other prior art methods. For example, U.S. Pat. No. 3,826,817, assigned to the present assignee, discloses a method for the synthesis of metal halides having extremely low hydroxyl ion contamination levels. These metal halides are synthesized by reacting an alkali salt in the solid state with a gaseous compound that is capable of simultaneously replacing the anion of the salt with a halide and gettering any water that might be produced by the chemical reaction.

U.S. Pat. No. 3,969,491, assigned to the present assignee, discloses a process wherein alkali metal halides in the molten form are scrubbed with gaseous nascent halogen, preferably a halogen corresponding to the halide anion. Once the gaseous nascent halogen has removed the trace impurities of both cations and anions, the purified material can then be utilized to form single crystals.

U.S. Pat. No. 3,932,597, assigned to the present assignee, discloses a process wherein metal halides are scrubbed with a halide-source species in the vapor phase to upgrade their purity. This process is effective in not only reducing the concentration of oxyanion impurities and volatile cation halide impurities, but it is also effective in reducing hydroxyl ion contamination as well.

U.S. Pat. No. 4,190,640 is an improved process for generating nascent bromines through the pyrolytic dissociation of $CBr_4$. This patent provides a reactive gas carrier comprised of a mixture of an inert gas such as nitrogen, argon or helium and nitric or nitrous oxide in the bromide pyrolysis chamber as the bromide is subjected to temperatures in excess of 600° C.

Though numerous attempts have been made to achieve ultrapure metal fluorides, the demands of the art mandate an ever increasing need for the purest material possible.

SUMMARY OF THE INVENTION

In accordance with the invention, a process is provided for the preparation of ultrapure heavy metal fluorides which behave as pseudo-noble metals of improved purity from their metal oxides by reacting an oxide of a heavy metal with a predetermined amount of aqueous hydrofluoric acid to form a solid reaction product. The reaction product is then dried under controlled heating to form a hydrated fluoride of the chosen heavy metal having a predetermined amount of hydration. The heavy metal fluoride is thereafter exposed to a reactive atmosphere comprising hydrofluoric acid vapor in a carbon dioxide reactive carrier gas and a selected halide compound in the gas phase at a predetermined elevated temperature for a predetermined period of time to further increase anion purity.

The present invention provides a process for the preparation of ultrapure heavy metal fluorides which behave as pseudo-noble metals having increased anionic purity.

The present invention provides a new and improved process for the preparation of heavy metal fluorides which behave as pseudo-noble metals having minimized water and water-derived impurities.

The present invention provides a new and improved process for producing heavy metal fluorides which behave as pseudo-noble metals having maximized optical transmission at 10.6 micrometers.

The foregoing and other advantages and features of the present invention will be apparent from the following description of the embodiments of the instant invention.

BRIEF DESCRIPTION OF THE DRAWINGS

FIG. 1 represents a comparison of three thermograms of lead fluoride: A and B depict lead fluoride which was supplied commercially, while C depicts lead fluoride which had undergone reactive atmosphere processing according to the instant invention.

FIG. 2 represents a comparison of the thermograms of these same compounds depicted as A', B', and C', in which the thermograms represent a plot of slope (temp°C./min) versus temperature of the curves shown in FIG. 1.

DETAILED DESCRIPTION OF THE INVENTION

A heavy metal fluoride has been generally characterized in the art as a metal fluoride having a high atomic weight. However, we are now aware of two specific subdivisions or subclasses within the broader class of heavy metal fluorides, namely, heavy metal fluorides wherein the heavy metal component behaves as a pseudo-noble metal and active metal fluorides. The behavior of these active metal fluorides is discussed in more depth in our U.S. Application, Ser. No. 686,774, entitled, "IMPROVED PROCESS FOR THE PREPARATION OF ULTRAPURE ACTIVE METAL FLUORIDES, filed on Dec. 27, 1984 now U.S. Pat. No. 4,752,454.

Heavy metal fluorides, as defined in accordance with the present invention, are good electron acceptors when in ion form. It should be noted that the donor or acceptor ability is with respect to oxygen. Heavy metal fluorides as utilized in the present invention can include compounds having a heavy metal component such as Pb, Ag, Tl, Hg, etc.

The process of the present invention for the preparation of ultrapure heavy metal fluorides comprises first, the reaction of a relatively pure (i.e., 99.9%) heavy metal oxide, for example lead oxide, which is commercially available, with a predetermined amount of electronic grade aqueous hydrofluoric acid (HF), with is 49 weight percent HF, at a temperature slightly above room temperature according to the following reaction:

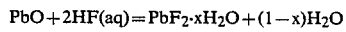

$$PbO + 2HF(aq) = PbF_2 \cdot xH_2O + (1-x)H_2O$$

After the above reaction is completed, the excess HF(aq) and water are removed by evaporation at or below approximately 100° C. The residue product is thereafter weighed at periodic intervals until the desired amount of conversion to $PbF_2 \cdot xH_2O$ is attained. The product, $PbF_2 \cdot xH_2O$, in this case is hydrated lead fluoride with x < 1. The lowest possible value of "x" which can be obtained is preferred. This particular hydrate composition is utilized because a hydrated product with minimal water content is preferred.

The second step of the process of the present invention involves exposing the hydrated lead fluoride ($PbF_2 \cdot xH_2O$) to reactive atmosphere processing. The reactant gases utilized in the process of the present invention are carbon dioxide gas ($CO_2$) as the reactive carrier gas; hydrofluoric acid (HF) vapor; and a selected fluoride compound in the gas phase such as carbon tetrachloride ($CCl_4$), other chlorofluoromethane derivatives such as dichlorodifluoromethane ($CCl_2F_2$), etc., or higher halo-carbon derivatives. All of these compounds are commercially available.

The preferred method of the present invention comprises step 1 as enumerated above. The second step comprises subjecting the hydrated product, i.e., hydrated lead fluoride, to a reactive atmosphere of hydrofluoric acid vapor, carbon tetrachloride gas and carbon dioxide as the reactive carrier gas. More specifically, the hydrated product, i.e., $PbF_2 \cdot xH_2O(c)$ is heated under hydrofluoric acid (HF) vapor with carbon dioxide as the reactive carrier gas, at a maximum of 900° C. Approximately 10–30 volume percent of the total gaseous mixture of HF, and $CCl_4$ was typically utilized, at a flow rate of approximately 1 cc/sec. The reaction mixture is then gradually cooled at which point $CCl_4(g)$ is introduced. $CCl_4(g)$ can be utilized during the initial heat up process and throughout the entire cool down process. However, only after the reaction temperature has reached 900° C. does the effectiveness of HF(g) with respect to the attack of $H_2O(g)$ from the apparatus outgas begin to decline. Therefore, it is only at this point that $CCl_4(g)$ is really needed. For the sake of efficiency, therefore, the preferred process of the instant invention utilizes $CCl_4(g)$ during the cool down cycle only. Typically, approximately 10–30 volume percent of $CCl_4$ would also be utilized at a flow rate of approximately 1 cc/sec. However, it should be noted that the exact flow rate or volume percent of any of the gases would be dependent upon the size of the sample being converted, as well as time contraints. These parameters are not critical and could be easily determined by one of skill in the art.

Another embodiment of the present invention comprises step 1 as previously discussed. The second step, however, utilizes a reactive atmosphere of hydrofluoric acid vapor in a carbon dioxide reactive carrier gas, however, this time utilizing chlorofluoromethane derivatives or other higher halo-carbon derivatives throughout the entire heat up and cool down cycles. Typical compounds of this type would include dichlorodifluoromethane ($CCl_2F_2$), trichlorofluoromethane ($CCl_3F$), etc.

Our studies have shown that for heavy metals, defined in accordance with the present invention, hydrolysis of the condensed phase, hereinafter designated as (c), by the ever-present outgas, $H_2O(g)$, introduces $OH^-$, a pseudohalide impurity which is isoelectronic and of the same size as $F^-$. The following equation illustrates how the pseudohalide impurity, $OH^-$, is produced:

$$F^-(c) + H_2O(g) = OH^-(c) + HF(g) \tag{1}$$

As a result of the continued accumulation of the $OH^-(c)$ impurity in the condensed phase, $O^=$ is also formed. $O^=$ is another impurity which is isoelectronic and about the same size as $F^-$. Its formation can be illustrated by the following equation:

$$2OH^-(c) = O^=(c) + H_2O(g) \tag{2}$$

At increasingly higher temperatures, the forward progress of Equation (2) is supported by Equation (1). More simply, any $OH^-(c)$ produced by Equation (1) is consequently consumed by Equation (2) as per the following:

$$2F^-(c) + H_2O(g) = O^=(c) + 2HF(g) \tag{3}$$

However at high temperatures, depending upon the heavy metal, the $O^=(c)$ impurity will predominate over the $OH^-(c)$. This is explained by the fact that the free energy of formation of $2HF(g)$ is much lower than that of $H_2O(g)$. As a result, $2HF(g)$ is formed more easily, thereby causing the forward reaction of Equation (3) to predominate. To counteract the forward progress of Equation (3), therefore, a metal fluoride with a low free energy of formation is needed so that the value of $2F^-(c)$ of the metal fluoride is lower than for $O^=(c)$ of the metal oxide. This will more than offset the difference in free energy of formation values between $2HF(g)$ and $H_2O(g)$. This constraint is easily satisfied by active metal fluorides but not by the heavy metal fluorides.

In the case of heavy metal fluorides which behave as pseudo-noble metals, such as lead fluoride, both the $OH^-$ and $O^=$ impurities can be vapor transported. As a result, a heavy metal fluoride film must be free from both $OH^-$ and $O^=$ contamination. For heavy metals, as defined in accordance with the present invention, the initial starting temperature for the forward progress of Equation (3) above is lower than the operating temperature for the evaporative deposition of the film. So although oxide contamination occurs easily in the source, the oxide species, in the case of these heavy metals is sufficiently volatile as to significantly contaminate the deposited material. This thereby further degrades the infrared transparency of the film. This behavior is in direct contrast to that of active metal fluorides wherein the $O^=$ impurity is involatile and hence is concentrated in the source and not in the film deposit.

The volatility of heavy metal oxides defined in accordance with the present invention is directly linked to their lattice energy. Active metal oxides have a much lower lattice energy than the heavy metal oxides of the present invention. A lower lattice energy results in a more stable compound. The fact that active metal oxides require higher operating temperatures than heavy metal oxides gives further support to this conclusion.

In our U.S. Ser. No. 343,637, now U.S. Pat. No. 4,519,986 we taught the preparation of ultrapure heavy metal fluorides by reacting thorium oxide with a predetermined amount of HF to form a solid reaction product. The hydrated thorium fluoride is subsequently exposed to a reactive atmosphere of HF in an inert helium carrier gas and a chosen fluoride compound, not including carbon tetrachloride, in the gas phase. However, in U.S. Ser. No. 343,637, now U.S. Pat. No. 4,519,986, the helium gas functioned merely as an inert carrier gas that did not aid in the liberation of water impurities. In the instant invention, however, the carbon dioxide reactive carrier gas is a reactant that does aid in the liberation of water impurities. We believe that after a certain point, the effectiveness of hydrofluoric acid (HF) vapor as an aid in the conversion of metal oxide to fluoride, as previously utilized in our U.S. Ser. No. 343,637, now U.S. Pat. No. 4,519,986, begins to decline.

Apparently, the conversion of lead oxide proceeds to some low value of $\alpha$ at an operating temperature of a maximum of 900° C. (significantly lower than that for active metals) as follows:

$$PbO(c) + 2(1-\alpha)HF(g) = PbF_{2(1-\alpha)}O_\alpha(c) + (1-\alpha)H_2O(g). \tag{4}$$

However, when the product of Equation (4) is cooled, an addition reaction occurs which shows the close analogy in behavior between H-OH and H-F, as illustrated by the following equations:

$$PbF_{2(1-\alpha)}O_\alpha(c) + \alpha H_2O(g) = PbF_{2(1-\alpha)}(OH)_{2\alpha}(c) \tag{5}$$

$$PbF_{2(1-\alpha)}O_\alpha(c) + \alpha HF(g) = PbF_{2\left(1-\frac{\alpha}{2}\right)}(OH)_\alpha(c) \tag{6}$$

As detailed earlier, this shift in composition from $PbF_{2(1-\alpha)}O_\alpha(c)$, the product of Equation (4), to the OH-containing products of Equations (5) and (6), consequently, results in a degradation in the optical transparency of the resulting film. In the case of heavy metal fluorides as defined in accordance with the present invention, the removal of both $OH^-$ and $O^=$ impurities are particularly important since both these impurities are vapor transported.

As a result, $CCl_4$ in conjunction with $CO_2$ is utilized in accordance with the preferred embodiment of the present invention to alleviate the sources of water contamination in the heavy metal fluoride products which occur not only as a result of the normal chemical synthesis, but additionally as a result of the outgassing of water vapor from the walls of the reaction apparatus at elevated temperatures.

Typically, heavy metal fluorides as defined in accordance with the present invention, require significantly lower operating temperatures (less than 900° C.) than active metal fluorides. CCl$_4$(g) is reactive at temperatures both above and below 900° C.; however at temperatures above 900° C., its chlorine atoms may indirectly replace fluorine atoms in the fluoride product with the OH$^-$ impurity, via substitution. Additionally, in the case of chlorofluoromethane derivatives or other higher halo-carbon derivatives, these gases are reactive at temperatures both above and below 900° C. CCl$_4$(g) and the chlorofluoromethane derivatives or other higher halo-carbon derivatives may be utilized throughout the initial heat up and cool down cycles of the reactive atmosphere processing step. However, since the effectiveness of HF(g) only begins to decline with respect to H$_2$O(g) as the temperature of the reaction system reaches approximately 900° C., it is preferable to use CCl$_4$(g), etc. only when the system begins to cool down in order to promote maximum efficiency.

At temperatures below 900° C., carbon tetrachloride gas (CCl$_4$) and the carbon dioxide reactive carrier gas (CO$_2$) react as a powerful getter for H$_2$O(g) as follows:

$$CO_2(g) + CCl_4(g) \rightarrow 2COCl_2(g) \tag{7}$$

$$COCl_2(g) + H_2O(g) \rightarrow CO_2(g) + 2HCl(g) \tag{8}$$

Equation (7) is favored in the forward direction, which produces a powerful getter for outgas H$_2$O(g) as illustrated by Equation (8) above. Equations (7-8) all occur in the gas phase before any interaction has taken place with a metal oxide.

Molecular Cl$_2$ and atomic Cl, the dissociation products of CCl$_4$, also attack H$_2$O(g) to form HCl(g), thereby liberating O$_2$(g). The Cl$^-$(c) impurity, shown below, is introduced by the displacement action of Cl(g) and Cl$_2$(g) on the anion impurities OH$^-$(c) and O$^=$(c):

$$Cl(g) + OH^-(c) \rightarrow Cl^-(c) + OH(g) \tag{9}$$

$$Cl_2(g) + O^=(c) \rightarrow 2Cl^-(c) + O(g) \tag{10}$$

The OH$^-$(c) and O$^=$(c) content of the heavy metal are low at the time that the dissociation products of CCl$_4$ begin to attack the outgas H$_2$O(g) These OH$^-$(c) and O$^=$(c) impurities result from the outgassing of H$_2$O(g) from the walls of the apparatus. The tradeoff or substitution of the Cl$^-$(c) impurity for the OH$^-$(c) impurity in the heavy metal fluoride product does not degrade and in fact, improves the optical transparency of the film. The use of HF(g) however, aids in preventing the excessive buildup of Cl$^-$(c) by an exchange wherein Cl$^-$(c) replaces F$^-$(c) such that F$^-$(c) becomes HCl(g).

In accordance with another embodiment of the instant invention, the chlorofluoromethane derivatives or other higher halo-carbon derivatives, for example, dichlorodifluoromethane (CCl$_2$F$_2$), can be utilized at temperatures both above and below 900° C. as previously discussed as follows:

$$CO_2 + CCl_2F_2 \rightarrow COCl_2 + COF_2 \tag{11}$$

The carbonyl chloride and carbonyl fluoride which is thereupon produced can further act as powerful getters for outgassed H$_2$O(g) as illustrated below:

$$COCl_2(g) + H_2O(g) \rightarrow CO_2(g) + 2HCl(g) \tag{12}$$

$$COF_2(g) + H_2O(g) \rightarrow CO_2(g) + 2HF(g) \tag{13}$$

Equation (12) corresponds to Equation (8), previously shown. Equations (11-13) all occur in the gas phase before any interaction has taken place with any hydrated metal fluoride. It is important to remember that reactions with heavy metals as defined in accordance with the present invention take place at comparatively lower operating temperatures than reactions with active metals. Since these operating temperatures are different, the rates of attack (or cleanup) for the various reactants are also different. Reactions with heavy metals as defined in accordance with the present invention, as a result of these lower operating temperatures take place much more slowly. This time element is a significant feature for large scale manufacturing.

In direct contrast to active metal fluorides, heavy metals which behave as pseudo-noble metals in their oxide and hydroxide form can be reduced by carbon or other highly reducing substances, such as tungsten, etc. Therefore, the behavior of such impure heavy metals fluorides, defined in accordance with the present invention, renders inapplicable the use of highly reducing boat or crucible materials.

The ultrapure heavy metal fluorides prepared in accordance with the process of the present invention are particularly useful for the deposition of thin films or dielectric coatings for optical components. The ultrapure heavy metal fluorides formed in accordance with the present invention have demonstrated low optical absorption at approximately 3.8 micrometers and maximum optical transmission at 10.6 micrometers.

EXAMPLE I

This example illustrates in detail the preparation of a heavy metal fluoride here, lead fluoride, utilizing the preferred process of the present invention.

A 425.45 gm sample of 99.9% pure lead oxide (PbO), obtained from Cerac Inc., of Milwaukee, Wis., was placed in a one-liter polytetrafluoroethylene beaker. Approximately 300 milliliters of deionized water was added and the mixture was thereafter stirred. The beaker was then placed for approximately thirty minutes in a boiling water bath. Approximately 160 ml of electronic grade aqueous HF (49 percent by weight HF), was thereafter added to the beaker in 30 ml portions. The additions of aqueous HF were made at intermittent intervals which permitted the highly exothermic reaction which occurred as a result of the addition of aqueous HF to subside before the next addition was made. The total amount of aqueous HF used was approximately two times the theoretical stoichiometric amount needed for complete conversion. Upon completion of the above reaction and after all HF(aq) additions had been made, 100 ml more of aqueous HF was added. Then the excess water and HF(aq) were evaporated to form a residue utilizing a water bath. The beaker containing the residue was weighed periodically in order to ascertain when the desired conversion point was reached. When the weight ratio of the residue to the starting material was approximately equal to or less than 18% higher after drying, conversion (to hydrated lead fluoride) was considered to be complete. The net weight of the hydrated lead fluoride was approximately 465.94 which indicated approximately 99.7% conversion to the anhydrous form (PbF$_2$).

Step 1 of the process of the instant invention as illustrated in this example took approximately 4 days to complete. Of course, this time factor will vary depending upon the size of the sample to be processed. The hydrated lead fluoride, $PbF_2 \cdot xH_2O$, with $x<1$ in this particular example, was then processed utilizing a reactive atmosphere as described below.

Utilizing the basic apparatus as illustrated in our U.S. Application Ser. No. 343,637, which issued as U.S. Pat. No. 4,519,986, with only minor modifications (not shown), two alumina boats having Pt foil linings and each containing a sample of the hydrated lead fluoride weighing between 50–60 gms, prepared as described above, were placed in an alumina reaction tube. The alumina reaction tube was capped and placed in a tubular silicon carbide furnace obtained from Lindbergh, Division of Sola Basic Industries of Watertown, Wis. The reaction tube was flushed with $CO_2$ gas and then HF gas was introduced at 10–30 volume percent, of the total gaseous mixture was and at a flow rate of approximately 1 cc/sec. Approximately 5–6 gms of HF gas was consumed per run. The furnace was heated up under $HF(g)$ and $CO_2(g)$ as the reactive carrier gas. At a maximum temperature of 900° C., carbon tetrachloride gas at 10–30 volume percent was introduced into the mixture. After approximately fifteen minutes at about 850° C.$\pm$50° C. the furnace was gradually cooled. The hydrofluoric acid gas was thereafter terminated when the temperature reached approximately 300° C.$\pm$50° C. The furnace containing the reaction mixture was subsequently cooled for the remainder of the period under carbon tetrachloride gas and carbon dioxide gas as the reactive atmosphere carrier gas. When the furnace was sufficiently cooled, the liquid source of carbon tetrachloride gas was bypassed and the system was flushed with carbon dioxide gas before the apparatus was opened. The complete cycle for the second step of reactive atmosphere processing for this example took approximately 16 hours time to complete. It should be noted that the time needed for processing would vary depending upon the size of the sample. The reaction tube was then opened and the product was collected from the alumina boat and weighed. The volatilization loss by the above-described process was less than 1%.

EXAMPLE II

The melting curves of metal fluorides become ill-defined as they become contaminated with anion impurities as illustrated in FIG. 5 and FIG. 6 of an article entitled "Congruent Melting and Crystal Growth of $LiRF_4$" by R. C. Pastor and M. Robinson, et al. in *Materials Research Bulletin*, Vol. 10, pp. 501–510, 1975. Consequently, this example compares the melting curves (as shown by thermogram analysis) of a heavy metal fluoride, lead fluoride, prepared commercially (See A and A'; B and B' of FIGS. 1 and 2), with a heavy metal fluoride prepared according to the process of the instant invention (See C and C' of FIGS. 1 and 2).

The lead fluoride sample depicted by thermograms A and A' in FIGS. 1 and 2, respectively, was obtained from Alfa Products, of Morton Thiokol, Inc. of Danvers, Md. The lead fluoride sample depicted by thermogram B and B' in FIGS. 1 and 2, respectively, was obtained from Balzers Optical Group of Marlborough, Md. Finally, the lead fluoride sample depicted by thermograms C and C' in FIGS. 1 and 2 respectively, had been produced utilizing reactive atmosphere processing according to the present invention. The thermograms of FIGS. 1 and 2 were prepared utilizing a Du Pont 1090 Thermal Analyzer (DTA). It should be noted that the thermograms of FIG. 2 represent a plot of slope (temperatures°C./min) versus temperature(°C.) of FIG. 1. This was done to sharpen the curves shown in FIG. 1 so that they could be more accurately analyzed.

An analysis of FIG. 1 shows peaks at approximately 800° C. for thermograms A, B and C. While thermograms A and C show more sharply defined and elongated melting peaks at 800° C. than thermogram B, thermograms B and C show better purity (indicated by the smooth lines) at temperatures between 200° C.–400° C. than thermogram A. In order to more carefully analyze the melting curves of the lead fluoride samples shown in FIG. 1, thermograms A', B', and C' (FIG. 2) were taken and prepared as discussed above.

Thermograms A', B' and C' of FIG. 2, as mentioned previously, represent a plot of the slope versus temperature (20 C.) of the melting curves, A, B and C, respectively, as depicted in FIG. 1. There is a clear distinction in the sharpness and elongation of the melting peaks of melting curves A' and C' versus that of B' at 800° C. However, curve A' (prepared by Alfa Products) displays lower purity as seen by its behavior at temperatures between 200° C.–400° C. (indicated by its wavy line) than is depicted by the corresponding regions of either curve B' (prepared by Balzers) or curve C' (prepared by the process of the instant invention). Therefore, the sample prepared according to the process of the instant invention, as depicted in thermograms C and C' in FIGS. 1 and 2 respectively, shows not only a clean thermogram at the region preceding melting but well-defined sharp melting peak.

Since it is clear that well-defined melting behavior is a means of measuring anion purity, it is evident that a heavy metal fluoride prepared according to the process of the present invention is significantly more pure.

What is claimed is:

1. A process for the preparation of a heavy metal fluoride, whose heavy metal component behaves as a pseudo-noble metal, from its heavy metal oxide comprising the steps of:
   (a) reacting the oxide of said heavy metal with an aqueous hydrofluoride acid to form a solid reaction product;
   (b) drying said solid reaction product by heating to remove water and to form a hydrated fluoride of said chosen heavy metal; and
   (c) exposing said hydrated heavy metal fluoride to a reactive atmosphere of hydrofluoric acid vapor in a carbon dioxide reactive carrier gas while simultaneously raising the temperature of said reaction mixture to a maximum of approximately 900° C.; and
   (d) at approximately 900° C., cooling the reaction mixture whereupon carbon tetrachloride gas is introduced into the reaction mixture while still gradually reducing the temperature of the reaction mixture.

2. The process of claim 1 wherein the heavy metal fluoride is lead fluoride.

3. A process for the preparation of a heavy metal fluoride, whose heavy metal component behaves as a pseudo-noble metal, from its heavy metal oxide comprising the steps of:
   (a) reacting the oxide of said heavy metal with an aqueous hydrofluoric acid to form a solid reaction product;
   (b) drying said solid reaction product by heating to remove water and to form a hydrated fluoride of said chosen heavy metal; and (c) exposing said hydrated heavy metal fluoride to a reactive atmosphere of hydrofluoric acid vapor in a reactive carbon dioxide carrier gas while simultaneously raising the temperature of said reaction mixture up to approximately 900° C.; and (d) at approximately 900° C. cooling the reaction mixture whereupon a chlorofluoromethane derivative gas or other higher halo-carbon derivative gas is introduced into said reaction mixture while still reducing the temperature of said reaction mixture.

4. The process of claim 3 wherein the chlorofluoromethane derivative is dichlorodifluoromethane.

5. The process of claim 3 wherein the chlorofluoromethane derivative is trichlorofluoromethane.

6. The process of claim 3 wherein the heavy metal fluoride is lead fluoride.

7. A process for the preparation of lead fluoride from lead oxide comprising the steps of:

(a) reacting lead oxide with approximately two times the theoretical stoichiometric amount of aqueous hydrofluoric acid to form a solid reaction product;

(b) drying said solid reaction product by heating to form hydrated lead fluoride, $PbF_2 \cdot xH_2O$ with $x<1$;

(c) exposing the hydrated lead fluoride to a reactive atmosphere of 10–30 volume percent of hydrofluoric acid vapor at a flow rate of 1 cc/sec in a carbon dioxide reactive carrier gas while simultaneously raising the temperature of the reaction mixture to a maximum of approximately 900° C.;

(d) at approximately 900° C., cooling the reaction mixture and thereafter introducing 10–30 volume percent of carbon tetrachloride gas at a flow rate of 1 cc/sec into said reaction mixture; and (e) further cooling the reaction mixture to completion to thereby produce a lead fluoride product.

* * * * *